No. 659,257. Patented Oct. 9, 1900.
J. N. POWELL.
RAILWAY RAIL FASTENING AND BRACE.
(Application filed Apr. 4, 1898.)
(No Model.)
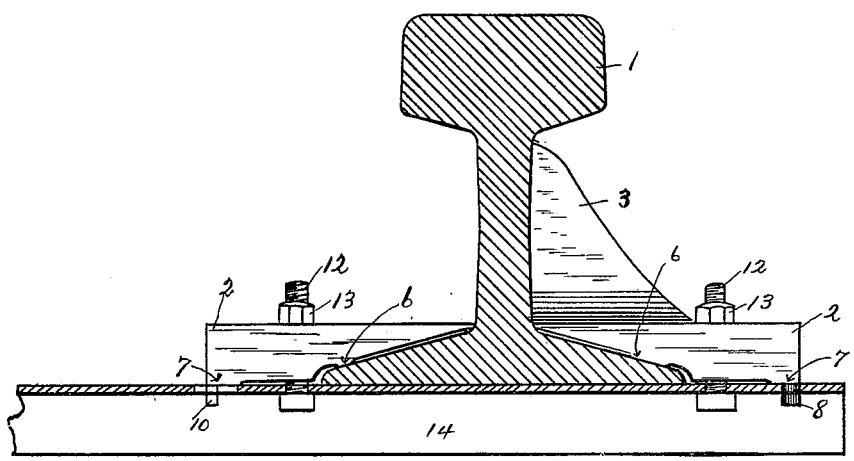
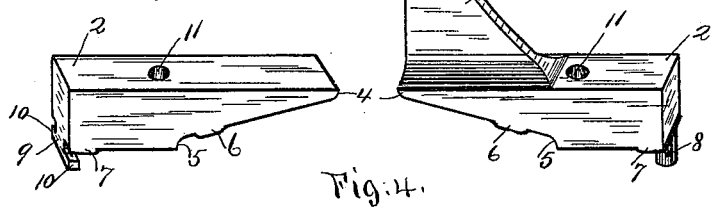
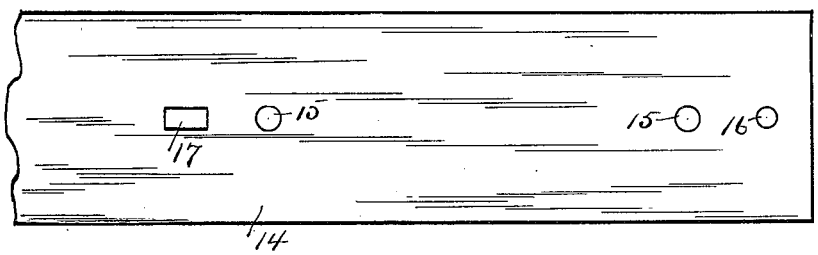
Witnesses
Walter H Graves
Jno. R Stephenson
Inventor.
Jasper N. Powell,
By N. B. Hagin Atty.

UNITED STATES PATENT OFFICE.

JASPER N. POWELL, OF WICHITA, KANSAS.

RAILWAY-RAIL FASTENING AND BRACE.

SPECIFICATION forming part of Letters Patent No. 659,257, dated October 9, 1900.

Application filed April 4, 1898. Serial No. 676,415. (No model.)

*To all whom it may concern:*

Be it known that I, JASPER N. POWELL, a citizen of the United States of America, residing at Wichita, in the county of Sedgwick and State of Kansas, have invented certain new and useful Improvements in a Railway-Rail Fastening and Brace, of which the following is a specification, reference being had therein to the accompanying drawings, and the figures of reference thereon, forming a part of this specification, in which—

Figure 1 is an end view of a railway-rail, showing a side view of the railway-rail fastener and brace and a sectional view of a metallic tie. Fig. 2 is a perspective view of one of said fasteners. Fig. 3 is a perspective view of said rail-fastener and rail-brace combined, and Fig. 4 is a top plan of a metallic railway-tie.

This invention relates to certain improvements in railway-rail fasteners and rail-braces; and it consists of the construction of the same.

Referring to the drawings, 1 represents a railway-rail.

2 represents a railway-rail fastening. 3 represents a rail-brace. 4 represents the end of the tapered side of said fastener. 5 represents the commencing-point of said tapered side. 6 represents a bearing-ridge on the under side of said tapering side. 7 represents a like ridge along the under side of the outer end of said fastening. 8 represents a lug made integral with said fastening and extending down from said ridge 7. 9 represents another style of lug, having the arms or flanges 10 extending out from either side. 11 represents a hole through said rail-fastening adapted to receive the bolt 12, which is provided with the nut 13.

14 represents a metallic railway-tie. 15 represents a hole through said tie for receiving said bolt 12. 16 represents a like hole in said tie for receiving said lug 8. 17 represents an oblong opening in said tie for receiving said lug 9.

This rail fastening and brace is used in the following way: The fastening without the brace is designed to be used in laying straight-line track and on the inside of the outer rail, and the rail fastening and brace combined are to be used on the outside of the outer rail in laying curved track. Said combined fastening and brace is made in different lengths for adjusting the gage of the track, the difference in length being from the hole 11 to the tapered end 4.

The end 4 of the rail-fastening should abut snugly against the rail. If said fastening should be too long to allow the proper alinement, said end 4 can be cut off to a proper length, or said fastening may be adjusted by sliding said lug 9, with its flanges 10, either way, and when in the desired position a hole 15 for the bolt 12 can be made to put said lug and flanges in said opening 17. The fastening 2 is turned sidewise, and the flanges 10 will pass through the long way of said opening, when said fastening can be turned around. The holes 15 and 16 are made in the tie 14 to receive the bolt 12 and lug 8. Said bolt 12 is put through said hole 15 from the under side. The lug 8 is placed in the hole 16, when the ridge 7 will rest on the tie 14 and the ridge 6 will rest on the flange of the rail 1. The nut 13 is screwed down on the bolt 12, which will draw the ridge 6 down firmly on the outer edge of said flange and said brace up snug against the web of said rail.

Having thus described my invention, what I claim as new and useful, and desire to secure by Letters Patent, is as follows:

In the herein-described railway-fastening, in combination with a railway-rail, and metallic tie, a metallic block 2 having a tapered end, the brace 3 extending upward from said tapered end, a lug 8 extending downward from the outer and lower edge of said block, said block having also the bolt-hole 11, the ridge 6 extending across the beveled surface, and the ridge 7 extending across the outer end and under surface of said block, and the bolt 12 for passing through said opening 11, substantially as shown, and described.

JASPER N. POWELL.

Witnesses:
THOMAS O. HOSS,
C. W. MCCOY.